United States Patent [19]

Albertin

[11] Patent Number: 5,530,679
[45] Date of Patent: Jun. 25, 1996

[54] METHOD FOR MIGRATING SEISMIC DATA

[75] Inventor: Uwe K. Albertin, Houston, Tex.

[73] Assignee: Western Atlas International, Inc., Houston, Tex.

[21] Appl. No.: 324,384

[22] Filed: Oct. 17, 1994

Related U.S. Application Data

[63] Continuation-in-part of Ser. No. 59,625, May 10, 1993, abandoned.

[51] Int. Cl.$^6$ .................... G01V 1/36; G01V 1/28
[52] U.S. Cl. .................... 367/68; 367/51; 364/421
[58] Field of Search .................... 364/421; 367/51–54, 367/68

[56] References Cited

U.S. PATENT DOCUMENTS

| | | | |
|---|---|---|---|
| 4,464,737 | 8/1984 | Pann | 367/49 |
| 4,943,950 | 7/1990 | Beasley et al. | 367/50 |
| 4,964,088 | 10/1990 | Chittieni | 367/51 |
| 5,274,605 | 12/1993 | Hill | 367/53 |

OTHER PUBLICATIONS

Hill, N. Ross, Gaussian Beam Migration, Geophysics, vol. 55, No. 11 (Nov. 1990), pp. 1416–1428.
Kosloff, Dan D., Baysalt, Edip, Migration with the Full Accoustic Wave Equation, Geophysics, vol. 48, No. 6 (Jun. 1983), pp. 677–687.
Pai, David M., Generalized f–k (frequency–wavenumber) Migration in Arbitrarily Varying Media, Geophysics, vol. 53, No. 12 (Dec. 1988), pp. 1547–1555.

Primary Examiner—Nelson Moskowitz
Attorney, Agent, or Firm—William A. Knox

[57] ABSTRACT

An approximate method for imaging seismic data that originates from steeply dipping or overturned strata. The method provides a viable alternate approach to the generalized f-k migration that does not rely explicitly on some form of perturbation series expansion and thus avoids the steep-dip instability that is present in previously-known methods. This method is particularly useful in the presence of a moderate lateral velocity gradient, something that prior-art methods have trouble accommodating. An advantageous feature of the disclosed method is that the migration/imaging operators are composed of simple numerical coefficients.

3 Claims, 6 Drawing Sheets

METHOD FOR MIGRATING SEISMIC DATA

This is a continuation-in-part of U.S. patent application Ser. No. 08/059,625, filed May 10, 1993 in the name of Uwe Albertin and now abandoned.

BACKGROUND OF THE INVENTION

1. Field of the Invention

This invention provides a computer-aided migration routine that is efficient and economical of computer time. The method is effective in the presence of moderate vertical and lateral velocity gradients and is capable of imaging steep dips and diving waves.

2. Discussion of the Prior Art

Although the art of seismic exploration is very well known, it will be briefly reviewed to provide definitions of technical terms to be referenced herein.

An acoustic source of any desired type such as, by way of example but not by way of limitation, a vibrator, an explosive charge, an air or gas gun, or an earth impactor, is triggered to propagate a wavefield radially from a source location. The wavefield insonifies subsurface earth formations whence it is reflected therefrom to return to the surface. The mechanical earth motions due to the reflected wavefield are detected as electrical signals by an array of seismic receivers or receiver groups distributed at preselected spaced-apart group intervals, at or near the surface of the earth, along a designated line of survey.

The mechanical motions detected by the receivers are converted to electrical, digital or optical signals which are transmitted over ethereal, electrical or optical data-transmission links to a multi-channel recording device. Usually, each receiver is coupled to a dedicated recording channel. An array may encompass many tens or hundreds of receivers which are coupled by the transmission link to a corresponding number of data-recording channels. To reduce the need for an excessive number of individual data transmission lines between the receivers and the recording channels, the receivers share a relatively few common transmission lines and the signals from each receiver are multiplexed into the appropriate data-recording channels by any convenient well-known means.

In operation, the selected source type successively occupies a plurality of source locations along the line of survey, launching a wavefield at each location. After each launch, the source is advanced along the line by a multiple of the receiver-spacing interval. At the same time, the receiver array is advanced along the line of survey by a corresponding distance.

The signals detected by the receivers and recorded on the respective data recording channels comprise an original set of raw seismic reflection data signals. The raw seismic data signals may be combined into gathers, processed, migrated and formatted into displays that image the subsurface earth layers along the line or area of survey under study.

The original analog seismic signals are usually digitized prior to recording for convenience in later processing. Following selected data processing routines, the processed digital data signals from each channel are then converted back to analog form for physical display as a sequence of time-scale oscillogram that clearly depict the configuration of the subsurface earth layers under study.

The original raw seismic reflection signal data sets are gathered solely to provide a picture of the subsurface of the earth for the purpose of exploiting the natural resources thereof for the benefit of humankind. Between the activities of data-gathering and data-displaying the seismic data signals may be subjected to the mathematical equivalents of filtering and other processes to remove noise, to improve the clarity of inter-layer bedding resolution, to reposition, as by migration, out-of-plane reflections and to perform other selected ministerial options.

It is recognized in the geophysical industry that seismic data-processing routines, which may be digital, exist to enhance the geophysical presentation and interpretation of subsurface geology as derived from the raw gathered seismic reflection signals. The seismic reflection signals are not gathered to solve some abstract mathematical formula.

Throughout this disclosure and wherever encountered, the simple phrase "data set" is a short-hand term that means "seismic reflection signal data set".

By definition, migration, as applied to the seismic art, is an inversion operation involving rearrangement of seismic data information sets so that the reflections and diffractions are plotted at their true locations. The need for this arises since the variable velocities and dipping horizons cause the elements of the data sets to be recorded at surface locations that are different from the true subsurface positions. The process is sometimes referred to as imaging. Migration can be accomplished by migrating along diffraction curves, by numerical finite differences or phase shift downward-continuation of the wavefield, and by equivalent operations in the frequency-wavenumber (f-k), frequency-offset ($\omega$-x) or other domains.

Migration methods in the wavenumber-frequency domain have been used extensively in the past to accomplish both prestack and poststack migration of seismic data. Those methods that extrapolate in depth typically use a phase shift operator whose argument is the depth step multiplied by the z-wavenumber. The main advantage of those methods is their ability to image extremely steep dips and even overturned reflection events. Their main drawback, however, is their inability to correctly handle lateral velocity variations. In order to handle such variations more correctly, several extensions to the phase shift method have been introduced. These methods include interpolation based techniques and techniques involving perturbation series expansions, such as the generalized f-k method of Pai in *Generalized F-K Migration In Arbitrarily Varying Media*, (1988), Geophysics, 53, pp 1547–1555. Interpolation methods can be costly because they require a Fourier transform at every depth step for each reference velocity used. If the number of reference velocities is too small, inaccuracies associated with the interpolation process arise.

In contrast, if velocity variations are not too severe, the generalized f-k approach may be the cheaper in principle because only one application of the slowness-squared operator is required at each depth step to first order in perturbation theory. That is equivalent to doing one forward and one inverse Fourier transform. However, the perturbation series approach has the drawback that the expansion is in terms of $(s_0\omega^2 - k^2)^{-1/2}$ arising from the free-space Green's function. Here $s_0$ is the zeroth Fourier component of the slowness squared and k is the spatial wavenumber. At steep dips, those factors diverge and hence the perturbation expansion becomes unstable.

Other methods for accomplishing depth migration in the presence of lateral velocity variations are known. The method described by D. Kosloff and E. Baysai, 1983 in *Migration With The Full Acoustic Wave Equation*, Geophysics, v. 48, pp 677–687, used a fourth-order Runge-Kutta method to solve the two-way wave equation. This method is carried out in the ω-x domain, however, the diving waves cannot be imaged. Further, stability restrictions because of evanescent energy necessarily limits the maximum dip that can be imaged using this technique in low-velocity areas.

Another alternate method for accomplishing steep-dip and diving-wave migration is *Gaussian Beam Migration* as taught be N. Hill in Geophysics, 1990, v. 55, pp 1416–1428. In that method the migration is not carried out in either the ω-x or f-k domains, but is done locally in a reference frame that is relative to the ray path. The method relies on an asymptotic solution to the wave equation however, and has difficulty imaging in areas where steep velocity gradients exist.

There is a need for an alternate approach to the generalized f-k migration that does not rely explicitly on any perturbation series expansion to thus avoid the steep-dip instability present in the prior-art formulations. The method should be able to image steep dips and diving waves if the lateral velocity variations are not too severe. The method should reduce to simple phase shift migration for velocity fields that are a function of depth only.

SUMMARY OF THE INVENTION

This is a method for migrating seismic data in the presence of an arbitrary three-dimensional velocity field. An operator $\hat{a}^2$ is redefined as the sum of two terms, the two terms being the operator $\hat{a}_1$ and the operator $\hat{a}_2$ where $\hat{a}_1 = \Delta z^2 (\partial^2/\partial x^2)$ and $\hat{a}_2 = \Delta z^2 \omega^2 / v^2(x, z)$. The operator $\hat{a}_1$ may be implemented in the Fourier domain by multiplying by the number $\hat{a}_1 = -\Delta z^2 k^2$. For each depth step $\Delta z$ in the migration process, the members of the original data set $\psi(z)$ are respectively multiplied by the operator $\hat{a}^2$ to provide a second data set $\zeta(z)$. In the Fourier domain the respective members of the second data set are divided by the corresponding members of the original data set to provide complex numbers $\tilde{a}^2$. Replace the original migration extrapolation operator $f(\hat{a}^2)$ with the new extrapolation operator $f(\tilde{a}^2)$ and apply said new extrapolation operator to the original data set to accomplish the downward extrapolation. The results of the application of the new extrapolation operator are used to form a tangible representation of the selected region of the subsurface of the earth with the aid of a computer graphics program.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

The acoustic wave equation Fourier transformed in time may be written thus:

$$\frac{\partial^2 \psi(\omega,x,z)}{\partial^2 z} = -\hat{b}^2 \psi(\omega,x,z) \text{ where } \hat{b}^2 = \frac{\omega^2}{v(x,z)^2} + \frac{\partial^2}{\partial x^2}.$$

Define the operator $\hat{a} = \Delta z\, b$ where $\Delta z$ is a small depth extrapolation step and $v(x,z)$ is the velocity within the area under study. There are a number of migration algorithms which use approximate solutions to the above equations. These solutions often yield depth extrapolation equations that have the form $$\psi(z+\Delta z) = f(\hat{a}^2)\psi(z)$$

where $f(\hat{a}^2)$ is some function of the operator $\hat{a}^2$. One example is the one-way extrapolation equation where $$f(\hat{a}^2) = e^{-1\sqrt{\hat{a}^2}}. \tag{1}$$

A second formulation is the two-way matrix extrapolation equation $$\Psi(z+\Delta z) = F(\hat{a}^2)\, \Psi(z),$$

where $$F = \begin{vmatrix} \cos(\hat{a}) & \hat{a}^{-1}\sin(\hat{a}) \\ -\hat{a}\sin(\hat{a}) & \cos(\hat{a}) \end{vmatrix}, \tag{2}$$

and $$\Psi = \left( \psi, \Delta z \frac{\partial \psi}{\partial z} \right).$$

When the velocity varies with depth only, $\hat{a}^2$ is diagonal in the Fourier domain so that the general operator $f(\hat{a}^2)$ is easy to implement by multiplication. When the velocity varies laterally as a function of x, the shot location, as well as vertically as a function of z, the depth, it has been found that the general operator above is almost impossible to implement efficiently. By contrast, the operator $\hat{a}^2$ by itself is easy to implement because it may be redefined as the sum of two terms thus:

$$\hat{a}^2 = \hat{a}_1 + \hat{a}_2,$$

where $$\hat{a}_1 = \Delta z^2 (\partial^2/\partial x^2) \text{ and } \hat{a}_2 = \Delta z^2 \omega^2 / v^2(x, z).$$

The operator $\hat{a}_2$ is diagonal in the spatial domain and is a pure number, being the quotient of the frequency squared times $\Delta z^2$ divided by the velocity squared (or the product of the frequency squared, the square of the depth step and the slowness squared).

Transforming the operator $\hat{a}_1$ to the Fourier domain, we have $\hat{a}_1 = -\Delta z^2 k^2$ which is diagonal in Fourier space and again is a pure number, being the square of a depth step multiplied by the square of the wavenumber. Hence, the operator $\hat{a}^2$ may be applied by applying the two terms in the two separate domains or in a single domain where one operator becomes a convolution.

Once a desired extrapolation method is chosen, such as one of the methods that were cited earlier in equations (1) or (2), the following approximate procedure can be used to perform the downward extrapolation. It will be assumed that the extrapolation is to be applied in the Fourier domain.

First apply the operator $\hat{a}^2$ to the data set $\psi(z)$ to derive a new data set $\zeta(z)=\hat{a}^2\psi(z)$. To perform that operation, first apply operator $\hat{a}_1$ to the members of the original data set. Next, transform the original data set into real space and apply operator $\hat{a}_2$ to the original data set to create an intermediate data set. Transform the intermediate data set back into the Fourier domain and sum with $\hat{a}_1\psi(z)$ to provide a new data set $\zeta(z)$. From this new data set, define and compute complex coefficients $\tilde{a}^2=(\zeta^2(z)/\psi^2(z))$ at every location in the $(\omega,k)$ plane for which the data are nonvanishing and wherein $k<\omega/v_{min}$, where $v_{min}$ is the minimum velocity at depth z.

The set of data for which this condition is true will contain all the data that may be characterized as essentially propagating. Unfortunately, because of the lateral velocity variation, this data set will also contain some data that may be characterized as essentially evanescent. If the entire set were to be downward continued, the algorithm would become unstable due to the presence of the evanescent data. To prevent that problem, a subset of the data is selected according to the following criterion: Data for which the real part of the coefficients $\tilde{a}$ is larger than the imaginary part are characterized as propagating. That data set is referred to as the propagating data set. Data for which the real part is less than the imaginary part are characterized as evanescent and will be referred to as the evanescent data set. Downward extrapolation of the propagating data set characterized in this way typically yields a stable algorithm. Meanwhile, the evanescent data set is saved and will be reimaged during a second-pass upward migration step.

The method of imaging overturned dips by saving evanescent wavelets for second-pass upward migration was disclosed in application Ser. No. 07/965,798, filed Oct. 23, 1992 and now U.S. Pat. No. 5,235,555, issued Aug. 10, 1993, assigned to the assignee of this application, which patent is incorporated herein by reference.

At this point, instead of applying the operator $f(\hat{a}^2)$ to the respective members of the propagating data set $\psi(z)$ to do the downward extrapolation, we simply multiply the members of the data set by the numbers $f(\tilde{a}^2)$ in accordance with the relation $\psi(z+\Delta z)=f(\tilde{a}^2)\psi(z)$. Sum over frequencies to obtain $\phi(k, z+\Delta z)$. Inverse Fourier transform to obtain the final image $\phi(x, z)$.

The evanescent data set that was previously saved is processed by applying an upward extrapolation operator $f'(\hat{a}^2)$ to the original data set to provide $\psi(z-\Delta z)=f'(\hat{a}^2)\psi(z)$. In a procedure similar to that used in the downward extrapolation, the operator $f'(\hat{a}^2)$ is replaced by coefficients $f'(\tilde{a}^2)$ to do the upward extrapolation. Sum over $\psi(\omega, k, z-\Delta z)$ to form a new data set $\phi'(k, z-\Delta z)$. Inverse fourier transform and add to $\phi(x, z)$ to obtain $\Phi=\phi+\phi'$, the migrated image in real space, including the diving waves.

The results of the application of the extrapolation operator are used to form a tangible representation of the selected volume of the subsurface of the earth with the aid of a computer-graphics program of any desired type such as AutoCAD to convert the processed seismic data signals into a physical display of the spatial configuration of the subsurface earth layers under study.

It is clear by their very definition, and, in fact it can be shown mathematically, that the numbers $f(\tilde{a}^2)$ when applied to the data set $\psi(z)$ give the same result as the exact operator $f(\hat{a}^2)$ to first order in a Taylor series expansion of the functions $f(\hat{a}^2)\psi$ and $f(\tilde{a}^2)\psi$ in the quantity $\hat{a}^2-a_0^2$, where $a_0^2=\Delta z^2(\omega^2 s_0-k^2)$ and $s_0$ is the spatial average slowness squared at the depth z. The procedure is thus equivalent in accuracy to Pai's first-order generalized f-k method but avoids the steep dip instability inherent in that method.

Figure 1:
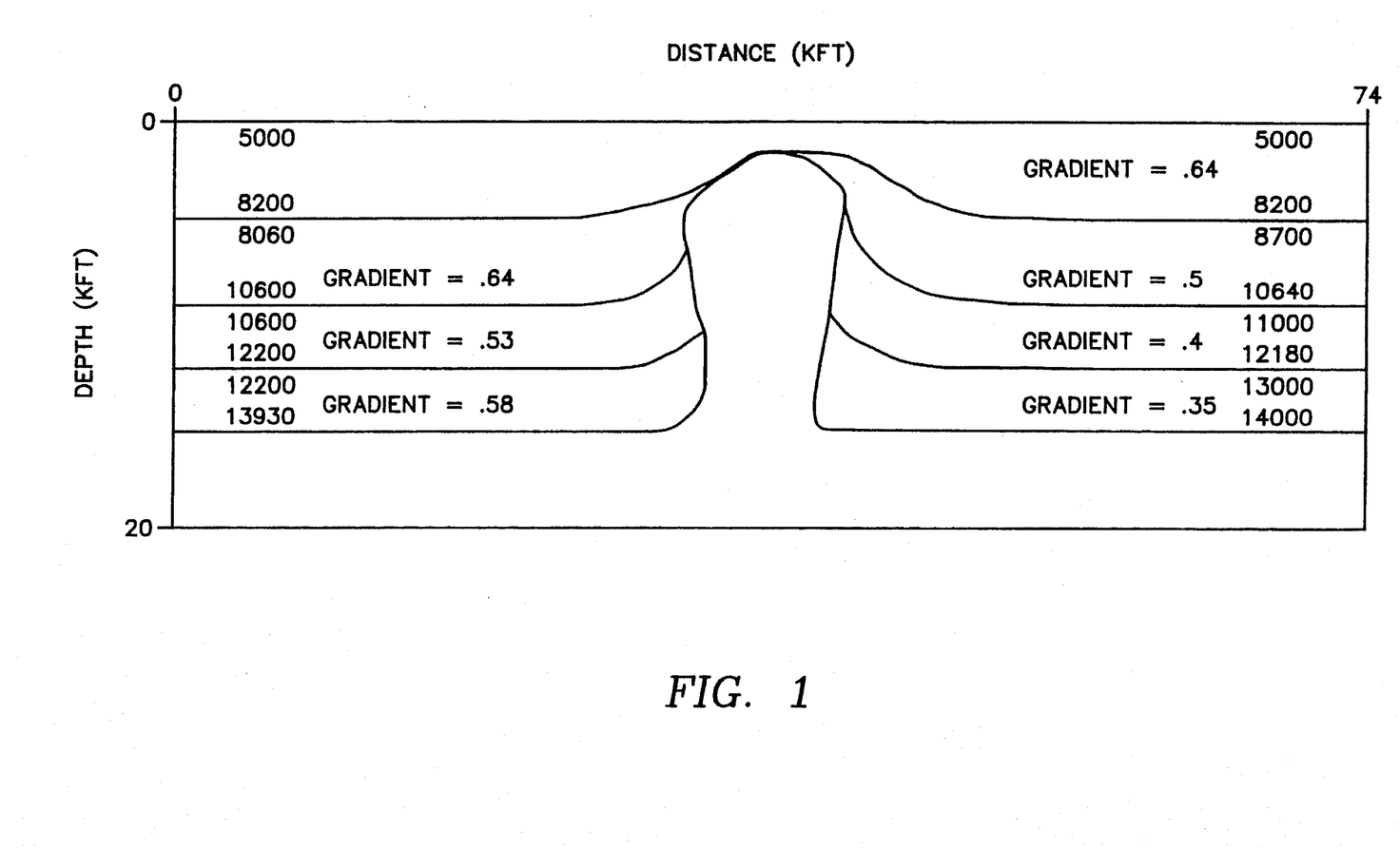
FIG. 1 is a velocity model used to create a synthetic seismic section.
Figure 2:
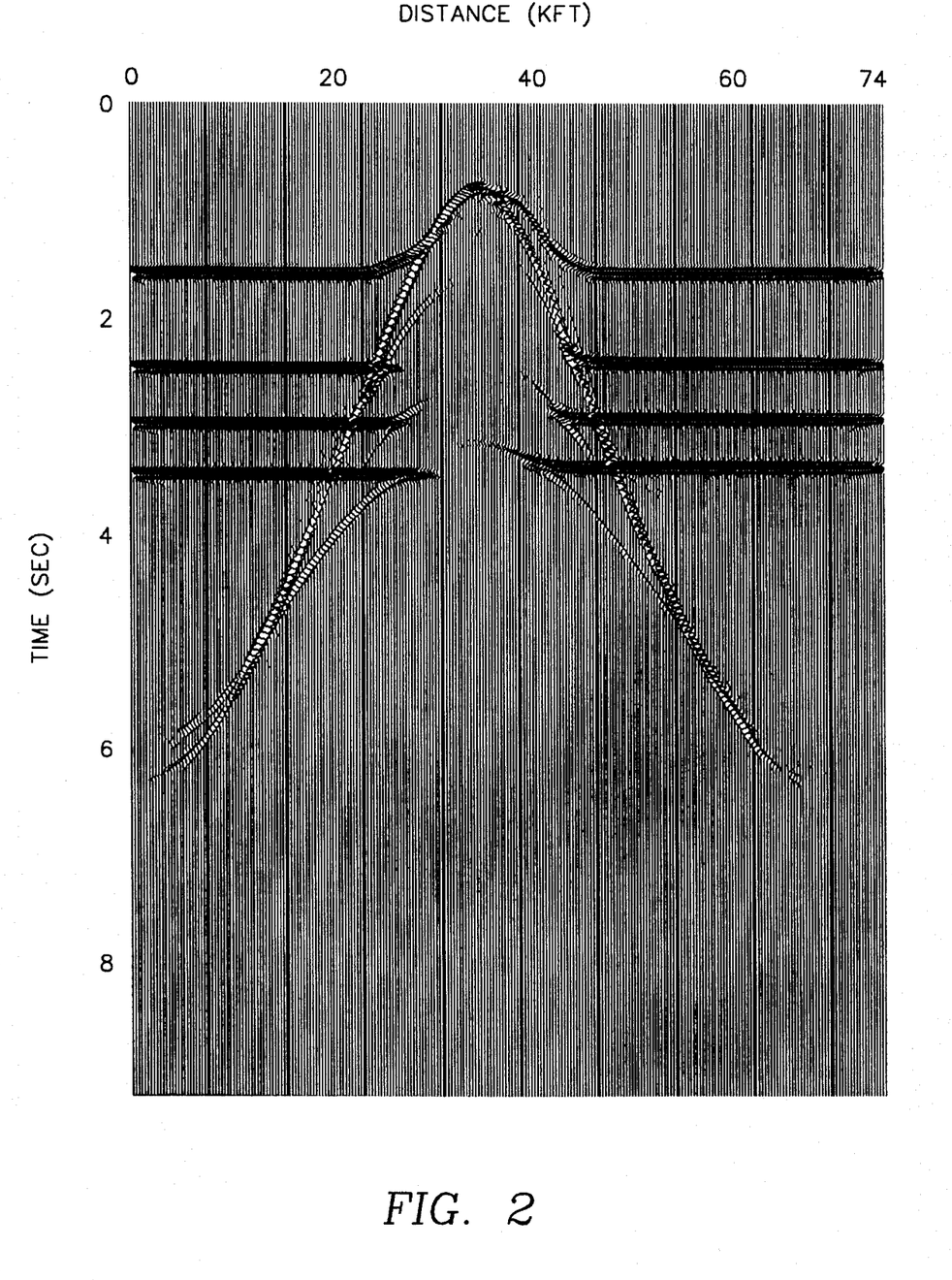
FIG. 2 is the unprocessed synthetic seismic section created from the model of FIG. 1.

FIG. 1 shows the velocity model that was used to create the synthetic seismic section of FIG. 2. Both vertical and moderate lateral velocity gradients exist. The velocity pattern and structural configuration are typical of Gulf Coast geology.

FIG. 2 is a synthetic seismic section that simulates an actual raw, unprocessed seismic section assembled from a field data set $\psi(x, z)$. Steep dips are present as are also events with dips exceeding 90°.

Figure 3:
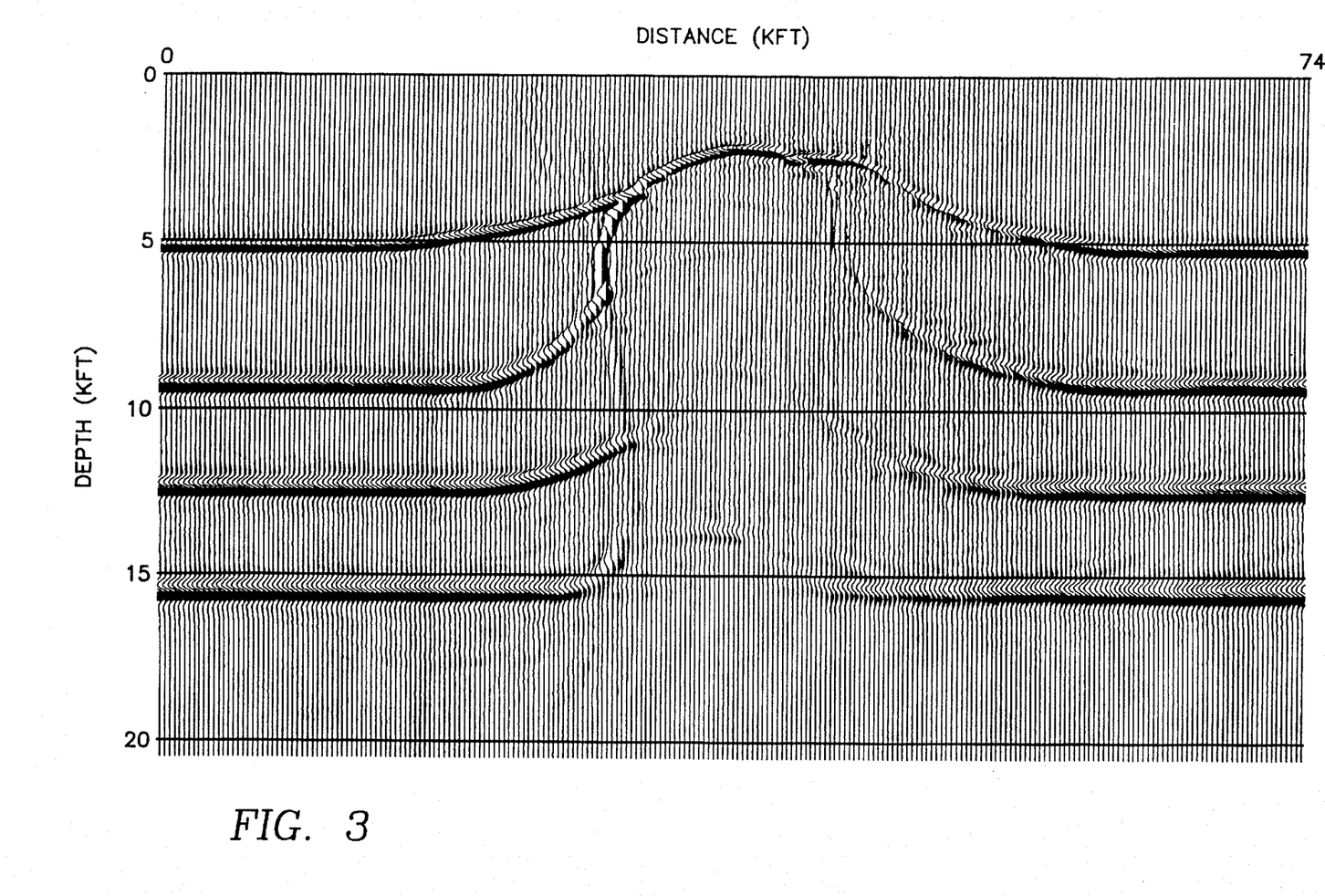
FIG. 3 is the seismic section of FIG. 2 processed according to the known Gaussian beam migration method.

FIG. 3 shows the result of processing the data set of FIG. 2 using a prior-art Gaussian Beam Migration which uses a fourth-order Runge-Kutta method to accomplish ray tracing. The left flank of the salt dome is well imaged but it was unable to handle imaging of the right flank where the velocity contrasts are very abrupt.

Figure 4:
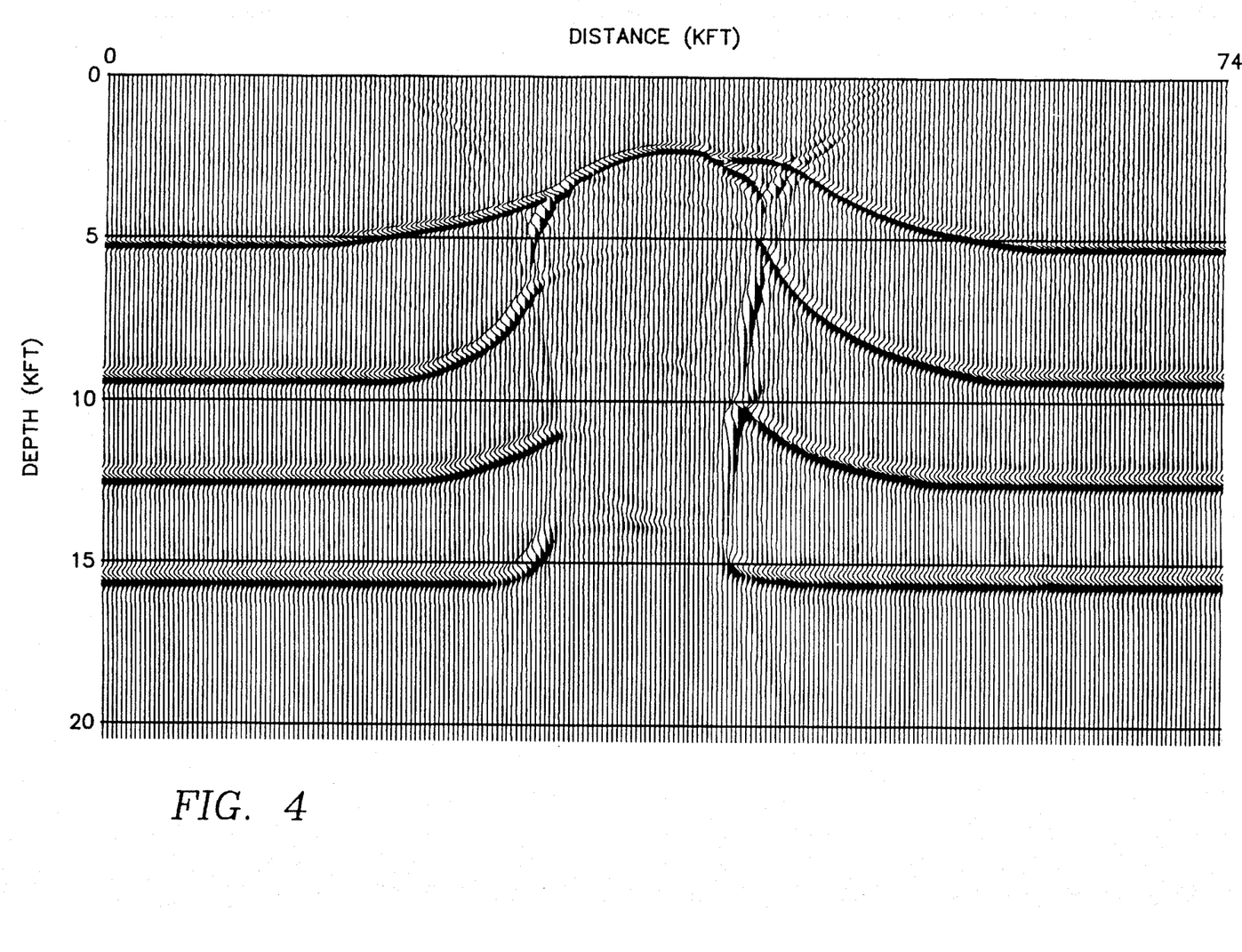
FIG. 4 shows the seismic section of FIG. 2 processed according to the method of this invention.

FIG. 4 shows the model migrated in real space as the sum $\Phi=\phi+\phi'$ using the method of this invention to generate a tangible representation of the geology of the subsurface of the earth. Although there is some background noise, both flanks of the salt dome appear to be well imaged.

Figure 5A:
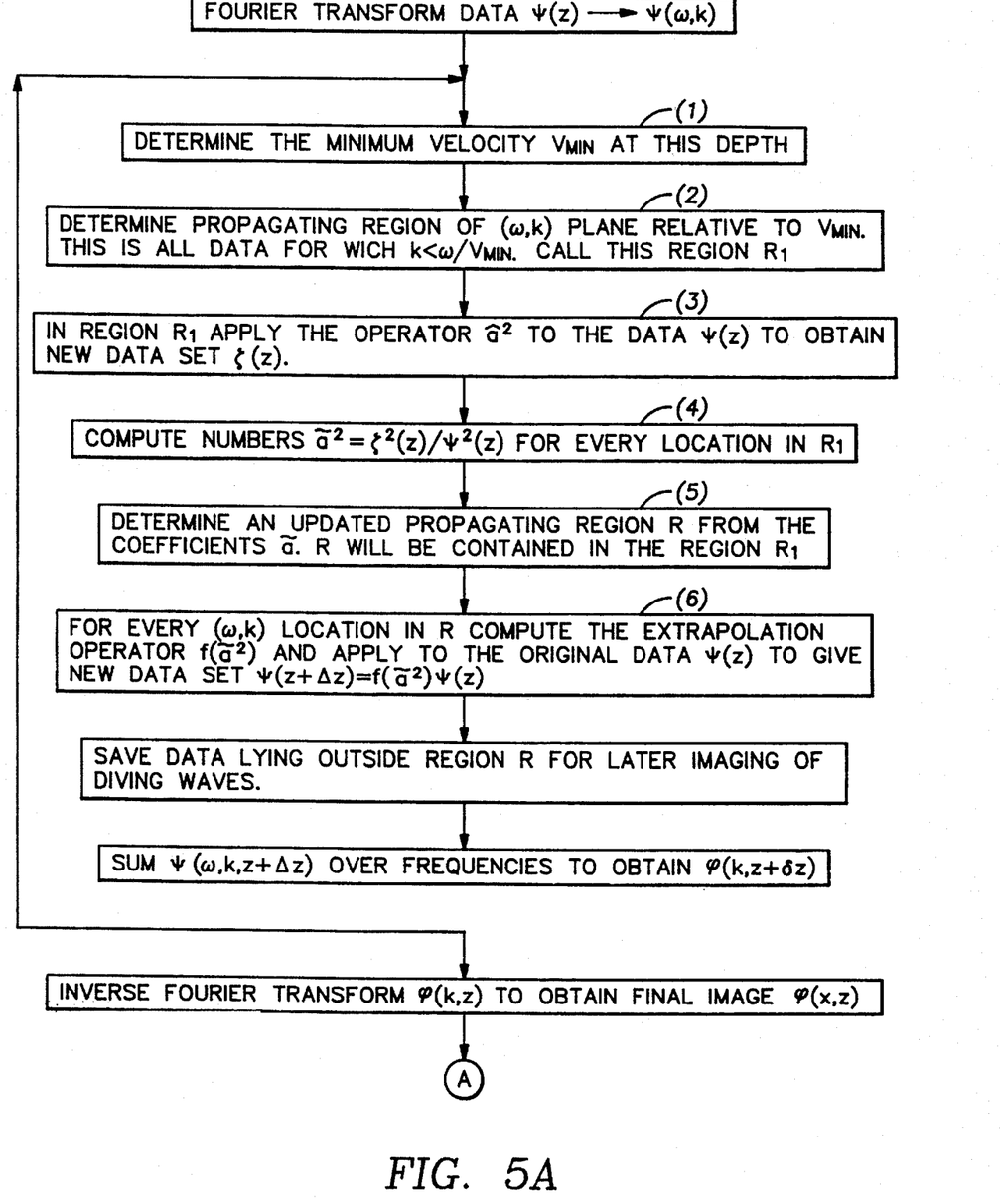
FIG. 5A and 5B comprise a flow diagram showing the steps of the preferred computer-aided processing method.
Figure 5B:
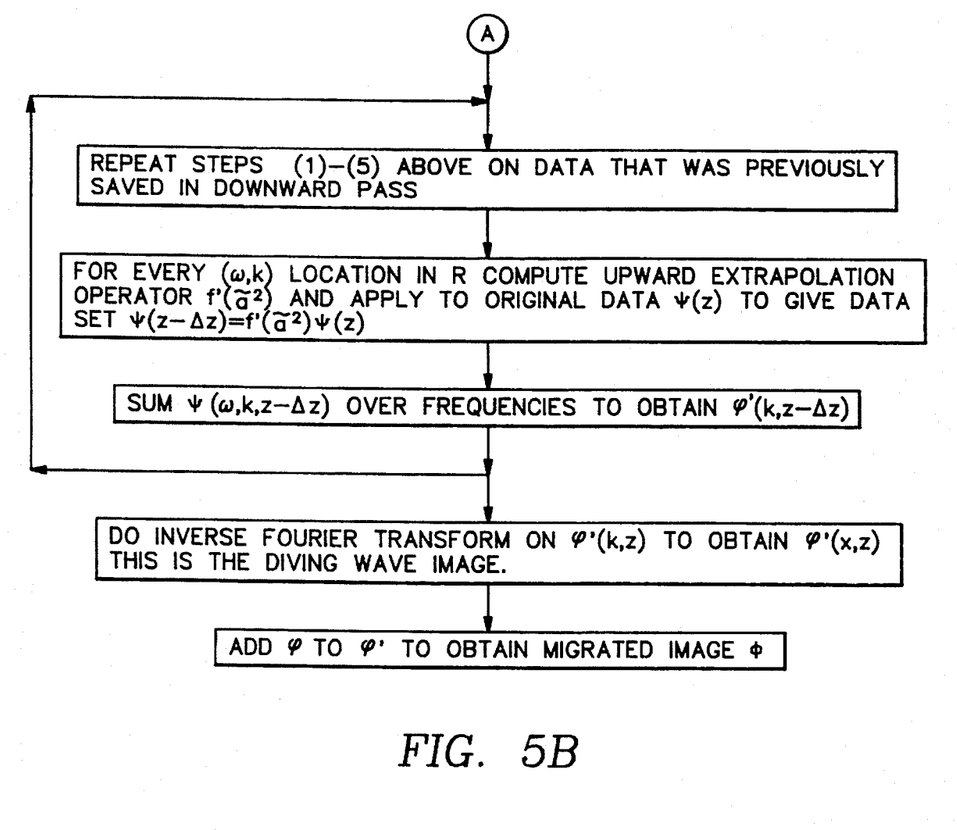

FIGS. 5A–5B comprise a flow diagram illustrating the preferred mode of operation of this invention to process a raw seismic data set to convert that data set into a tangible representation of the subsurface of the earth. The flow diagram simply illustrates the steps recited in the previous paragraphs and therefore a detailed explanation is not needed here.

This invention has been described with a certain amount of specificity by way of example but not by way of limitation. Other techniques and modifications of this method will be conceived of by those skilled in the art but which will fall within the scope and spirit of this disclosure which it limited only be the appended claims.

What is claimed is:

1. A computer-aided method for imaging members of an original raw reflection seismic-signal data set, $\psi(z)$, gathered from a selected volume of the subsurface of the earth, comprising the steps of:

(a) selecting a general extrapolation operator $f(\hat{a}^2)$;

(b) decomposing the operator $\hat{a}^2$ into two terms, $$\hat{a}_1=\Delta z^2\,(\partial^2/\partial x^2) \text{ and } \hat{a}_2=\Delta z^2\omega^2/v^2(x,z);$$

(c) transforming $\hat{a}_1$ to the Fourier domain to define $$\hat{a}_1=-\Delta z^2 k^2;$$

(d) multiplying each member of said original raw seismic reflection signal data set by the respective operators $\hat{a}_1$ and $\hat{a}_2$ thereby to form a second seismic signal data set $\zeta(z)$;

(e) forming a set of complex coefficients $$\tilde{a}^2=\zeta(z)/\psi(z);$$

(f) applying an extrapolation operator $f(\tilde{a}^2)$ to the respective corresponding members of said original raw seismic reflection signal data set $\psi(z)$ thereby to form a migrated seismic signal data set $\phi((k, z+\Delta z)$;

(g) inversely Fourier-transforming the migrated seismic signal data set $\phi(k, z+\Delta z)$ to form seismic signal data set $\phi(x, z)$ to provide a tangible representation of a selected volume of the subsurface of the earth with the aid of a computer-graphics program for converting the processed seismic data signals into a physical display of the spatial configuration of the subsurface earth layers.

2. The method as defined by claim 1, comprising:

determining the minimum velocity $v_{min}$ at a selected depth;

executing steps a–e and defining respectively a propagating seismic signal data set $\psi(z)$ and an evanescent seismic signal data set $\psi'(z)$ using the coefficients $\tilde{a}$;

saving said evanescent seismic signal data set;

applying step (f) to said propagating seismic signal data set to form migrated seismic signal data set $\phi(k, z, z+\Delta z)$ and inversely transforming said migrated seismic signal data set to form $\phi(x, z)$;

executing steps a–e for data set $\psi'(z)$ to define an upward extrapolation operator $f'(\tilde{a}^2)$;

applying $f'(\tilde{a}^2)$ to said evanescent seismic signal data set $\psi'(z)$ to define migrated diving wave seismic signal data set $\phi'(k, z-\Delta z)$;

imaging diving waves by inversely Fourier-transforming $\psi'(k, z-\Delta z)$ to form $\phi'(x, z)$; and defining a migrated image of said original raw seismic reflection signal data set as the sum $\phi+\phi'$.

3. The method as defined by claim 2, wherein:

said original raw seismic reflection signal data set $\psi(z)$ is initially transformed to the f-k Fourier domain from the space domain $\omega$-x.

* * * * *